(12) United States Patent
Sato

(10) Patent No.: US 9,062,987 B2
(45) Date of Patent: Jun. 23, 2015

(54) TRAVEL GUIDANCE SYSTEM, TRAVEL GUIDANCE APPARATUS, TRAVEL GUIDANCE METHOD, AND COMPUTER PROGRAM

(75) Inventor: Yuji Sato, Owariasahi (JP)

(73) Assignee: AISIN AW CO., LTD., Aichi-ken (JP)

(*) Notice: Subject to any disclaimer, the term of this patent is extended or adjusted under 35 U.S.C. 154(b) by 392 days.

(21) Appl. No.: 13/538,464

(22) Filed: Jun. 29, 2012

(65) Prior Publication Data

US 2013/0006523 A1 Jan. 3, 2013

(30) Foreign Application Priority Data

Jul. 1, 2011 (JP) .................................. 2011-147245

(51) Int. Cl.
G01C 21/30 (2006.01)
G01C 21/32 (2006.01)
G01C 21/36 (2006.01)

(52) U.S. Cl.
CPC ........ G01C 21/3655 (2013.01); G01C 21/3644 (2013.01)

(58) Field of Classification Search
CPC . G01C 21/3655; G01C 21/3644; G01C 21/36
USPC ......... 701/400, 408, 410, 412, 418, 422, 423, 701/425, 428, 431, 433, 437, 466, 468
See application file for complete search history.

(56) References Cited

U.S. PATENT DOCUMENTS

| 5,177,685 | A | * | 1/1993 | Davis et al. ................ 455/456.5 |
| 6,084,543 | A | * | 7/2000 | Iizuka ...................... 342/357.31 |
| 7,949,468 | B2 | * | 5/2011 | Nakayama et al. ........... 701/423 |
| 8,078,379 | B2 | * | 12/2011 | Lu ................................... 701/93 |
| 8,175,800 | B2 | * | 5/2012 | Nakayama et al. ........... 701/410 |
| 2007/0061071 | A1 | * | 3/2007 | Torii .............................. 701/209 |
| 2007/0124069 | A1 | * | 5/2007 | Nakayama et al. ........... 701/210 |

(Continued)

FOREIGN PATENT DOCUMENTS

| EP | 0874221 A2 | * 10/1998 |
| EP | 1793206 A2 | 6/2007 |

(Continued)

OTHER PUBLICATIONS

European Search Report issued Jun. 4, 2014 in European Patent Application No. 12172120.3.

*Primary Examiner* — Dalena Tran
*Assistant Examiner* — Jaime Figueroa
(74) *Attorney, Agent, or Firm* — Sughrue Mion, PLLC

(57) ABSTRACT

A travel guidance system including a navigation-route setting unit; a traffic-light-position acquiring unit that acquires a position of an exit-side traffic light at a preceding junction that is located closer to a departure place of a navigation route than a guidance junction; a movable-body-position acquiring unit that acquires a position of a movable body; a guidance-starting-point acquiring unit, the guidance starting point being determined from a position of the movable body relative to the exit-side traffic light at the preceding junction; a passage determining unit that determines whether the movable body has passed through the guidance starting point from the position of the movable body and the position of the guidance starting point; and a junction guiding unit that starts the guidance on the guidance junction when the passage determining unit determines that the movable body has passed through the guidance starting point.

10 Claims, 9 Drawing Sheets

(56) References Cited

U.S. PATENT DOCUMENTS

| | | | |
|---|---|---|---|
| 2009/0105938 A1* | 4/2009 | Tomita et al. | 701/200 |
| 2009/0319171 A1* | 12/2009 | Nakayama et al. | 701/201 |
| 2010/0026804 A1 | 2/2010 | Tanizaki et al. | |
| 2011/0054771 A1* | 3/2011 | Rossio et al. | 701/200 |
| 2011/0098910 A1* | 4/2011 | Saarimaki et al. | 701/200 |
| 2011/0130956 A1* | 6/2011 | Tracton et al. | 701/201 |

FOREIGN PATENT DOCUMENTS

| | | |
|---|---|---|
| EP | 1912043 A1 | 4/2008 |
| JP | 07-027569 | 1/1995 |
| JP | 10-274544 A | 10/1998 |
| JP | 2007232573 A | 9/2007 |
| JP | 2008-275455 | 11/2008 |
| JP | 2009250622 A | 10/2009 |

\* cited by examiner

FEATURE DB 32

| COORDINATES (POSITION) | TYPE OF ROAD SURFACE MARKING | ID | OBJECT TO BE CONTROLLED | ALONG-THE-ROAD DISTANCE TO OBJECT TO BE CONTROLLED |
|---|---|---|---|---|
| (x1, y1) | STOP LINE | 123 | JUNCTION | 8 m |
| (x2, y2) | STRAIGHT ARROW | 543 | CORNER | 54 m |
| (x3, y3) | MAXIMUM SPEED (40) | 678 | STOP LINE | 112 m |
| (x4, y4) | PEDESTRIAN CROSSING AHEAD | 923 | STOP LINE | 60 m |
| ... | ... | ... | ... | ... |

FIG. 4

GUIDANCE PHRASE CONDITION TABLE ~33

| GUIDANCE (DETAIL OF VOICE TO BE OUTPUT) | CONDITION FOR STARTING GUIDANCE |
|---|---|
| TURN LEFT (RIGHT) AT THE THIRD TRAFFIC LIGHT | WHEN VEHICLE PASSED THROUGH GUIDANCE STARTING POINT SET FOR EXIT-SIDE TRAFFIC LIGHT AT THIRD PRECEDING JUNCTION (WHEN VEHICLE PASSED THROUGH POINT AT WHICH EXIT-SIDE TRAFFIC LIGHT AT THIRD PRECEDING JUNCTION BECOMES INVISIBLE TO VEHICLE OCCUPANT) |
| TURN LEFT (RIGHT) AT THE SECOND TRAFFIC LIGHT | WHEN VEHICLE PASSED THROUGH GUIDANCE STARTING POINT SET FOR EXIT-SIDE TRAFFIC LIGHT AT SECOND PRECEDING JUNCTION (WHEN VEHICLE PASSED THROUGH POINT AT WHICH EXIT-SIDE TRAFFIC LIGHT AT SECOND PRECEDING JUNCTION BECOMES INVISIBLE TO VEHICLE OCCUPANT) |
| TURN LEFT (RIGHT) AT THE NEXT TRAFFIC LIGHT | WHEN VEHICLE PASSED THROUGH GUIDANCE STARTING POINT SET FOR EXIT-SIDE TRAFFIC LIGHT AT FIRST PRECEDING JUNCTION (WHEN VEHICLE PASSED THROUGH POINT AT WHICH EXIT-SIDE TRAFFIC LIGHT AT FIRST PRECEDING JUNCTION BECOMES INVISIBLE TO VEHICLE OCCUPANT) |
| ... | ... |

FIG. 5

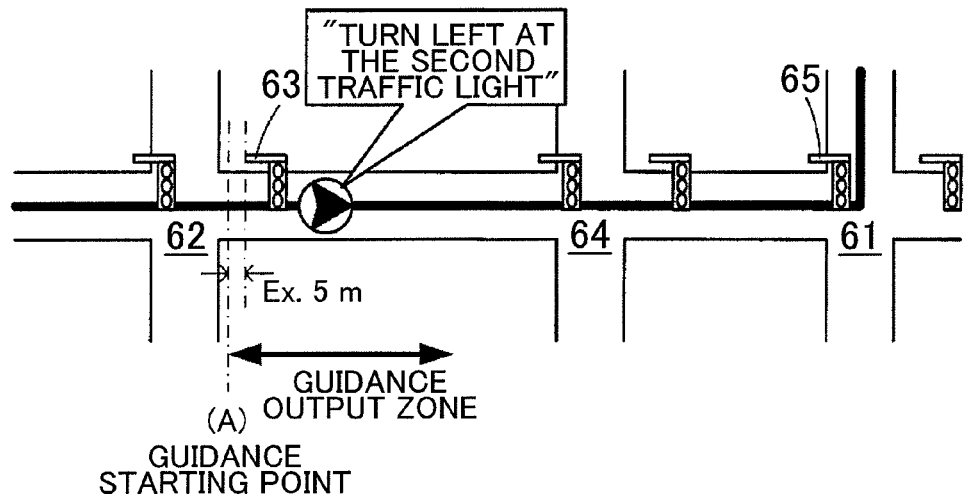

(A)
GUIDANCE STARTING POINT

FIG. 8A

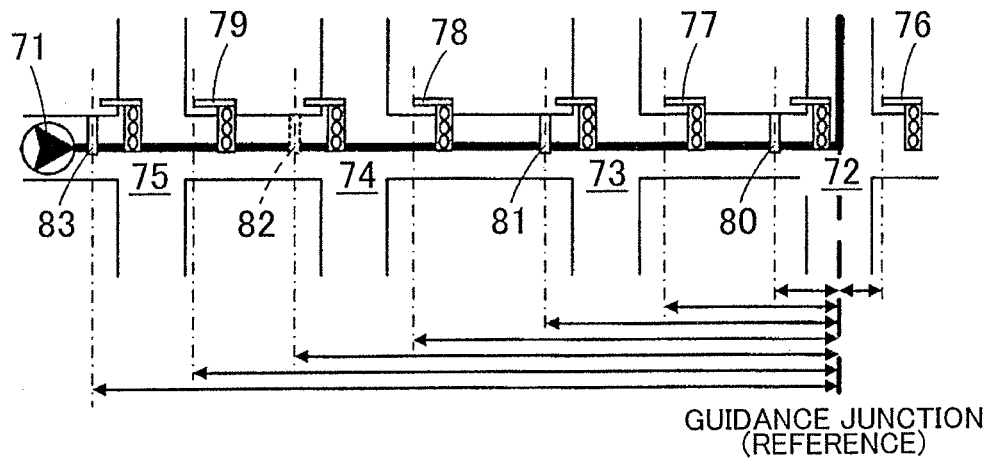

GUIDANCE JUNCTION
(REFERENCE)

FIG. 8B

FEATURE TABLE 34

| JUNCTION NO. | CONTENT | ID | RELATIVE DISTANCE FROM GUIDANCE JUNCTION | SUB-INFORMATION | |
|---|---|---|---|---|---|
| 0 GUIDANCE JUNCTION | TRAFFIC LIGHT | --- | −10 m | NUMBER OF LIGHTS | 3 |
| | STOP LINE | 123 | 20 m | TYPE | REAL STOP LINE |
| 1 | TRAFFIC LIGHT | --- | 80 m | NUMBER OF LIGHTS | 3 |
| | STOP LINE | 234 | 120 m | TYPE | REAL STOP LINE |
| 2 | TRAFFIC LIGHT | --- | 180 m | NUMBER OF LIGHTS | 1 |
| | STOP LINE | 345 | 220 m | TYPE | VIRTUAL STOP LINE |
| 3 | TRAFFIC LIGHT | --- | 280 m | NUMBER OF LIGHTS | 3 |
| | STOP LINE | 456 | 320 m | TYPE | REAL STOP LINE |

TRAVEL GUIDANCE SYSTEM, TRAVEL GUIDANCE APPARATUS, TRAVEL GUIDANCE METHOD, AND COMPUTER PROGRAM

INCORPORATION BY REFERENCE

The disclosure of Japanese Patent Application No. 2011-147245 filed on Jul. 1, 2011 including the specification, drawings and abstract is incorporated herein by reference in its entirety.

BACKGROUND OF THE INVENTION

Systems, apparatuses, methods, and computer-readable mediums consistent with the present invention relate to travel guidance, and more particularly to guiding movable bodies along navigation routes.

DESCRIPTION OF THE RELATED ART

Recently, navigation systems that provide drivers with travel guidance have been installed in many vehicles so that the drivers can easily reach desired destinations. The term "navigation system" refers to a system that can detect the current positions of vehicles in which the navigation systems are installed using, for example, GPS receivers; acquire map data corresponding to the current positions via, for example, recording media such as DVD-ROMs and HDDs or via networks; and display the map data on, for example, liquid crystal monitors. Such a navigation system has a route search function of searching for an optimum route from a place of departure to a destination on the basis of a desired destination input by a user. The navigation system displays a navigation route set on the basis of the search results on a display screen, and provides the user with guidance using voice and the display screen when the vehicle approaches junctions at which the user is to be instructed to, for example, turn right or left (hereinafter referred to as "guidance junctions") so as to reliably guide the user to the desired destination. Recently, some devices such as cellular phones, personal digital assistants (PDAs), and personal computers have also been provided with functions similar to those of the navigation systems, and are capable of providing guidance described as above for pedestrians and two-wheeled vehicles in addition to the vehicles.

When a user is instructed to, for example, turn right or left at a guidance junction, it is necessary for the user to correctly identify the guidance junction. In order for the user to correctly identify the guidance junction, guidance based on traffic lights installed at junctions on the way to the guidance junction, or preceding junctions, may be provided for the user. For example, the number of traffic lights between the current position of the vehicle and the guidance junction may be used for the guidance.

For example, the number of traffic lights between the current position of the vehicle and the guidance junction is used for voice guidance on the guidance junction in Japanese Patent Application Publication No. 10-274544 (JP 10-274544 A, page 5). According to this technology, a point a predetermined distance short of the guidance junction or a point from which the vehicle will travel to the guidance junction for a predetermined period of time is detected as a guidance output point, and guidance is output when the current position of the vehicle matches the guidance output point.

SUMMARY OF THE INVENTION

In order for a user to identify a guidance junction, it is important that guidance starts at an appropriate timing. In particular, in cases where the guidance is provided on the basis of traffic lights installed at preceding junctions as described in JP 10-274544, it is important that the guidance starts at an appropriate timing in accordance with the details of the guidance compared with other guidance methods (for example, those using the distance from a movable body to a guidance junction). If the guidance does not start at an appropriate timing, the user may misidentify the guidance junction.

However, a guidance starting point is defined at a point a predetermined distance short of the guidance junction or a point at which the vehicle must travel for a predetermined period of time to reach the guidance junction, guidance is difficult to start at an appropriate timing, and the user may misidentify the guidance junction.

The embodiments of the present invention has been designed to address the above-described problem, and the embodiments of the invention are capable of starting guidance based on traffic lights installed at preceding junctions at an appropriate timing based on the details of the guidance and capable of allowing a user to correctly identify a guidance junction.

A travel guidance system according to a first aspect of the present invention includes: a navigation-route setting unit that sets a navigation route along which a movable body is guided and a guidance junction on the navigation route; a traffic-light-position acquiring unit that acquires a position of an exit-side traffic light at a preceding junction that is located closer to a departure place of the navigation route than the guidance junction; a movable-body-position acquiring unit that acquires a position of the movable body; a guidance-starting-point acquiring unit that acquires a position of a guidance starting point serving as a point determined from a position of the movable body relative to the exit-side traffic light at the preceding junction and serving as a point where guidance on the guidance junction starts; a passage determining unit that determines whether or not the movable body has passed through the guidance starting point from the position of the movable body and the position of the guidance starting point; and a junction guiding unit that starts the guidance on the guidance junction when the passage determining unit determines that the movable body has passed through the guidance starting point.

The term "movable body" herein includes pedestrians and two-wheeled vehicles in addition to vehicles.

The term "guidance junction" herein corresponds to a junction at which a user of the system is instructed to, for example, turn left or right while the movable body is guided according to the navigation route.

The term "exit-side traffic light" herein refers to the traffic light nearest to an exit side of the junction in a direction along which the movable body passes through the junction, that is, the last traffic light visible to the user when the movable body passes through the junction.

According to a second aspect, the travel guidance system according to the first aspect further includes: a feature detecting unit that detects a feature on a departure place side of the navigation route at the preceding junction; a distance calculating unit that calculates a travel distance of the movable body after the feature detecting unit detects the feature; and a feature-distance acquiring unit that acquires a feature distance serving as a distance between the feature and the guidance starting point. The passage determining unit determines whether or not the movable body has passed through the guidance starting point from the travel distance and the feature distance.

The term "feature" herein corresponds to an object on a road or that in the vicinity of the road, and the position or the angle of the object is fixed. The feature may include, for example, obstacles, buildings, and road signs (including road surface markings).

According to a third aspect, in the travel guidance system according to the second aspect, the feature detecting unit detects the feature formed on the road on which the movable body travels from an image captured by an image capturing unit attached to the movable body, and the passage determining unit determines that the movable body has passed through the guidance starting point when a distance obtained by adding the travel distance to a distance between the feature and the movable body when the feature is detected by the feature detecting unit becomes more than or equal to the feature distance.

According to a fourth aspect, the travel guidance system according to the second or third aspect further includes a feature-information acquiring unit that acquires feature information of the feature detected by the feature detecting unit and positional information associated with the feature. The feature-distance acquiring unit acquires the feature distance from the feature information and positional information relating to the exit-side traffic light at the preceding junction.

According to a fifth aspect, in the travel guidance system according to any one of the second to fourth aspects, the feature is a road surface marking formed on a road surface on which the movable body travels.

The term "road surface marking" herein includes, for example, stop lines, pedestrian crossings, character strings, and maximum speeds.

According to a sixth aspect, in the travel guidance system according to the fifth aspect, the feature detecting unit detects a stop line as the road surface marking.

According to a seventh aspect, in the travel guidance system according to any one of the first to sixth aspects, the movable body is a vehicle. The travel guidance system further includes a vehicle-information acquiring unit that acquires vehicle information relating to the vehicle; and a switching-point determining unit that determines a switching point at which a state of the exit-side traffic light at the preceding junction is switched from visible to invisible to an occupant of the vehicle from the vehicle information. The guidance starting point is the switching point.

A travel guidance apparatus according to an eighth aspect includes a navigation-route setting unit that sets a navigation route along which a movable body is guided and a guidance junction on the navigation route; a traffic-light-position acquiring unit that acquires a position of an exit-side traffic light at a preceding junction that is located closer to a departure place of the navigation route than the guidance junction; a movable-body-position acquiring unit that acquires a position of the movable body; a guidance-starting-point acquiring unit that acquires a position of a guidance starting point serving as a point determined from a position of the movable body relative to the exit-side traffic light at the preceding junction and serving as a point where guidance on the guidance junction starts; a passage determining unit that determines whether or not the movable body has passed through the guidance starting point from the position of the movable body and the position of the guidance starting point; and a junction guiding unit that starts the guidance on the guidance junction when the passage determining unit determines that the movable body has passed through the guidance starting point.

A travel guidance method according to a ninth aspect includes the steps of: setting a navigation route along which a movable body is guided and a guidance junction on the navigation route; acquiring a position of an exit-side traffic light at a preceding junction that is located closer to a departure place of the navigation route than the guidance junction; acquiring a position of the movable body; acquiring a position of a guidance starting point serving as a point determined from a position of the movable body relative to the exit-side traffic light at the preceding junction and serving as a point where guidance on the guidance junction starts; determining whether or not the movable body has passed through the guidance starting point from the position of the movable body and the position of the guidance starting point; and starting the guidance on the guidance junction when it is determined that the movable body has passed through the guidance starting point.

A computer program according to a tenth aspect causes the computer to perform the functions of: setting a navigation route along which a movable body is guided and a guidance junction on the navigation route; acquiring a position of an exit-side traffic light at a preceding junction that is located closer to a departure place of the navigation route than the guidance junction; acquiring a position of the movable body; acquiring a position of a guidance starting point serving as a point determined from a position of the movable body relative to the exit-side traffic light at the preceding junction and serving as a point where guidance on the guidance junction starts; determining whether or not the movable body has passed through the guidance starting point from the position of the movable body and the position of the guidance starting point; and starting the guidance on the guidance junction when it is determined that the movable body has passed through the guidance starting point.

In the travel guidance system according to the first aspect having the above-described structure, the guidance on the guidance junction is started when the movable body passes through the guidance starting point determined from the position of the movable body relative to the exit-side traffic light at the preceding junction. This enables the guidance on the guidance junction to be started at an appropriate timing based on the details of the guidance. As a result, the user can correctly identify the guidance junction.

In the travel guidance system according to the second aspect, it is determined whether or not the movable body has passed through the guidance starting point from the travel distance of the movable body after the feature is detected and the feature distance between the feature and the guidance starting point. This enables the positional relationship between the movable body and the guidance starting point to be correctly determined using the feature provided at the preceding junction. As a result, the guidance on the guidance junction can be started exactly when the movable body passes through the guidance starting point.

In the travel guidance system according to the third aspect, the movable body captures the image of the feature using the image capturing unit, and thereby the position of the movable body after the image of the feature is captured can be correctly determined from the position of the movable body relative to the feature. As a result, the positional relationship between the movable body and the guidance starting point can be correctly determined, and the guidance on the guidance junction can be started exactly when the movable body passes through the guidance starting point.

In the travel guidance system according to the fourth aspect, the feature distance between the feature and the guidance starting point is acquired from the feature information of the feature and the positional information associated with the feature. This enables the feature distance to be easily calculated from the feature information without extra processes for calculating the feature distance.

In the travel guidance system according to the fifth aspect, it is determined whether or not the movable body has passed through the guidance starting point from the travel distance of the movable body after the road surface marking formed on the road surface is detected and the feature distance between the road surface marking and the guidance starting point. This enables the positional relationship between the movable body and the guidance starting point to be correctly determined using the road surface marking such as a stop line and a pedestrian crossing formed at the preceding junction.

In the travel guidance system according to the sixth aspect, it is determined whether or not the movable body has passed through the guidance starting point from the travel distance of the movable body after the stop line formed on the road surface is detected and the feature distance between the stop line and the guidance starting point. This enables the positional relationship between the movable body and the guidance starting point to be correctly determined using the stop line formed at the preceding junction. Since there is an extremely high probability that stop lines are drawn on the road surface near junctions at which traffic lights are installed, the positional relationship between the movable body and the guidance starting point is reliably determined when the movable body passes through the preceding junction.

In the travel guidance system according to the seventh aspect, the switching point at which the state of the exit-side traffic light at the preceding junction is switched from visible to invisible to the occupant of the vehicle is defined as the guidance starting point. This enables the guidance on the guidance junction to be started when the exit-side traffic light at the preceding junction becomes invisible to the vehicle occupant. As a result, the guidance on the guidance junction can be started at an appropriate timing based on the details of the guidance. In particular, a significant effect can be obtained when the guidance uses traffic lights.

In the travel guidance apparatus according to the eighth aspect, the guidance on the guidance junction is started when the movable body passes through the guidance starting point determined from the position of the movable body relative to the exit-side traffic light at the preceding junction. This enables the guidance on the guidance junction to be started at an appropriate timing based on the details of the guidance. As a result, the user can correctly identify the guidance junction.

In the travel guidance method according to the ninth aspect, the guidance on the guidance junction is started when the movable body passes through the guidance starting point determined from the position of the movable body relative to the exit-side traffic light at the preceding junction. This enables the guidance on the guidance junction to be started at an appropriate timing based on the details of the guidance. As a result, the user can correctly identify the guidance junction.

In the computer program according to the tenth aspect, the guidance on the guidance junction is started when the movable body passes through the guidance starting point determined from the position of the movable body relative to the exit-side traffic light at the preceding junction. This enables the guidance on the guidance junction to be started at an appropriate timing based on the details of the guidance. As a result, the user can correctly identify the guidance junction.

BRIEF DESCRIPTION OF THE DRAWINGS

FIG. 4 illustrates an example guidance phrase condition table;

FIG. 5 illustrates a guidance starting point defined by the guidance phrase condition table;

FIG. 8A illustrates a guidance junction, and FIG. 8B illustrates an example feature table;

DETAILED DESCRIPTION OF THE EMBODIMENTS

Figure 1:
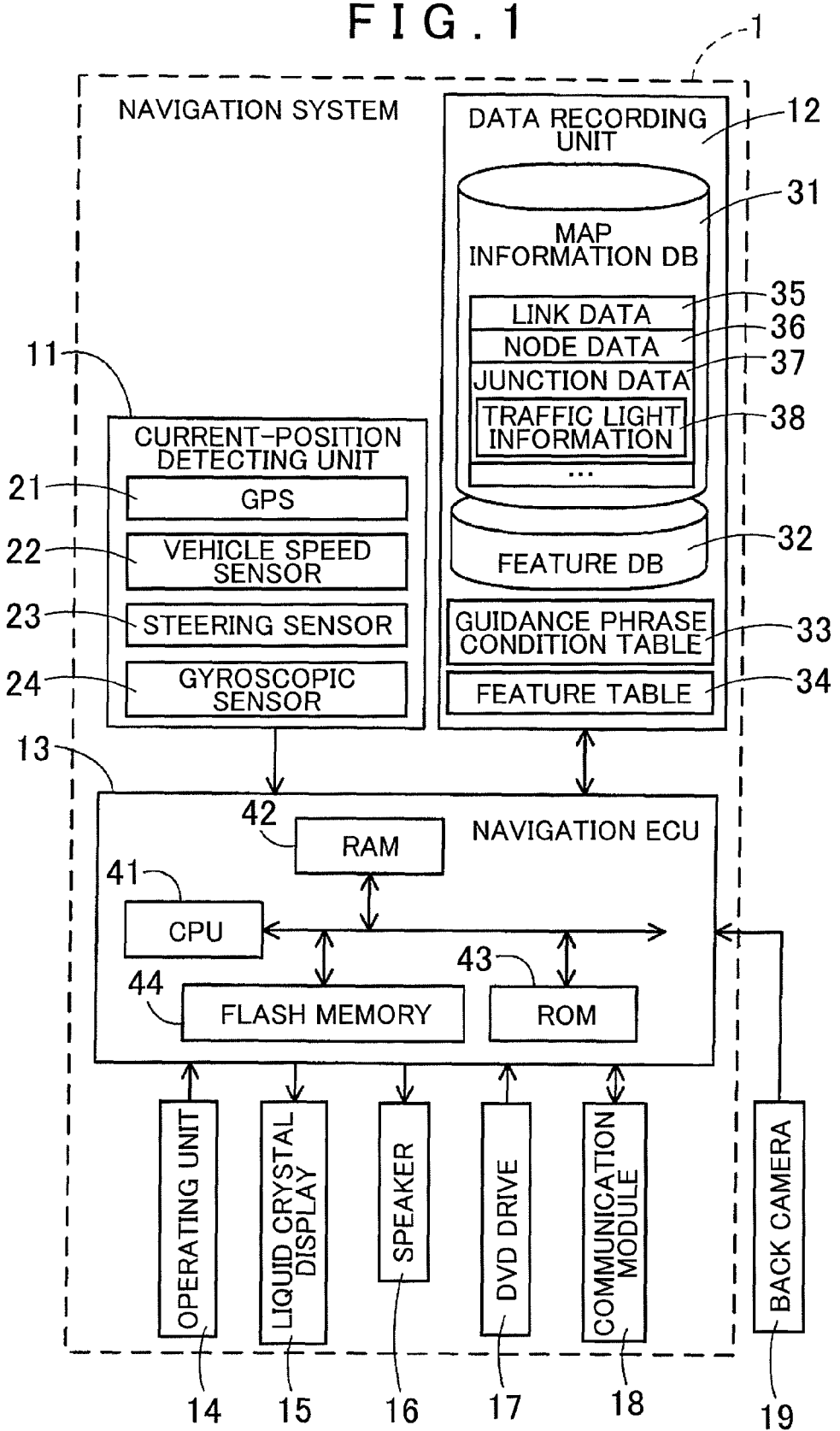
FIG. 1 is a block diagram of a navigation system according to an exemplary embodiment.

An exemplary embodiment of a travel guidance system and a travel guidance apparatus, embodied as a navigation system, will now be described in detail with reference to the drawings. First, the structure of a navigation system 1 according to this exemplary embodiment will be schematically described with reference to FIG. 1. FIG. 1 is a block diagram of the navigation system 1 according to this embodiment.

As illustrated in FIG. 1, the navigation system 1 according to this embodiment includes a current-position detecting unit 11 that detects the current position of a vehicle in which the navigation system 1 is installed, a data recording unit 12 that records various data, a navigation electronic control unit (ECU) 13 that performs various calculations on the basis of input information, an operating unit 14 that receives operations from users, a liquid crystal display 15 that displays a map of an area around the vehicle and facility information relating to facilities for the users, a speaker 16 that outputs voice guidance on navigation routes, a DVD drive 17 that reads DVDs serving as storage media, and a communication module 18 that communicates with information centers such as probe centers and the Vehicle Information and Communication System (VICS; registered trademark in Japan) center. In addition, a back camera 19 for detecting road surface markings (described below) is connected to the navigation system 1.

Components that constitute the navigation system 1 will now be described in sequence.

The current-position detecting unit 11 includes, for example, a GPS 21, a vehicle speed sensor 22, a steering sensor 23, and a gyroscopic sensor 24 to detect the current position, the orientation, and the travel speed of the vehicle, the current time, and other parameters. In particular, the vehicle speed sensor 22 detects the travel distance and the speed of the vehicle, and generates pulses in accordance with the rotation of driving wheels of the vehicle to output pulse signals to the navigation ECU 13. The navigation ECU 13 counts the generated pulses to calculate the rotational speed of the driving wheels and the travel distance. The navigation system 1 does not need to include all the five sensors described above, and may include only one or more sensors among the five sensors.

The data recording unit 12 includes a hard disk (not illustrated) and a recording head (not illustrated). The hard disk serves as an external storage device and a recording medium, and the recording head serves as a driver for reading, for example, a map information database (DB) 31, a feature DB 32, a guidance phrase condition table 33, a feature table 34, and predetermined programs recorded in the hard disk and for writing predetermined data into the hard disk. The data recording unit 12 may include optical disks such as memory cards, CDs, and DVDs instead of the hard disk.

The map information DB 31 is a storage unit that stores, for example, link data 35 relating to roads (links), node data 36 relating to nodes, junction data 37 relating to junctions, point data relating to points such as facilities, map display data for displaying maps, route search data for searching for routes, and point search data for searching for points.

The link data 35 includes, for example, link IDs used to identify the links, end node information used to determine nodes located at the ends of the links, and the types and the numbers of traffic lanes of the roads that constitute the links. The node data 36 includes, for example, node IDs used to identify the nodes, the positional coordinates of the nodes, and target node information used to determine target nodes to which the nodes are connected via the links. The junction data 37 includes, for example, relevant node information used to determine nodes that form the junctions (intersections), connected link information used to determine links connected to the junctions (herein after referred to as "connected links"), and traffic light information 38 relating to traffic lights installed near the junctions.

Figures 2, 3:
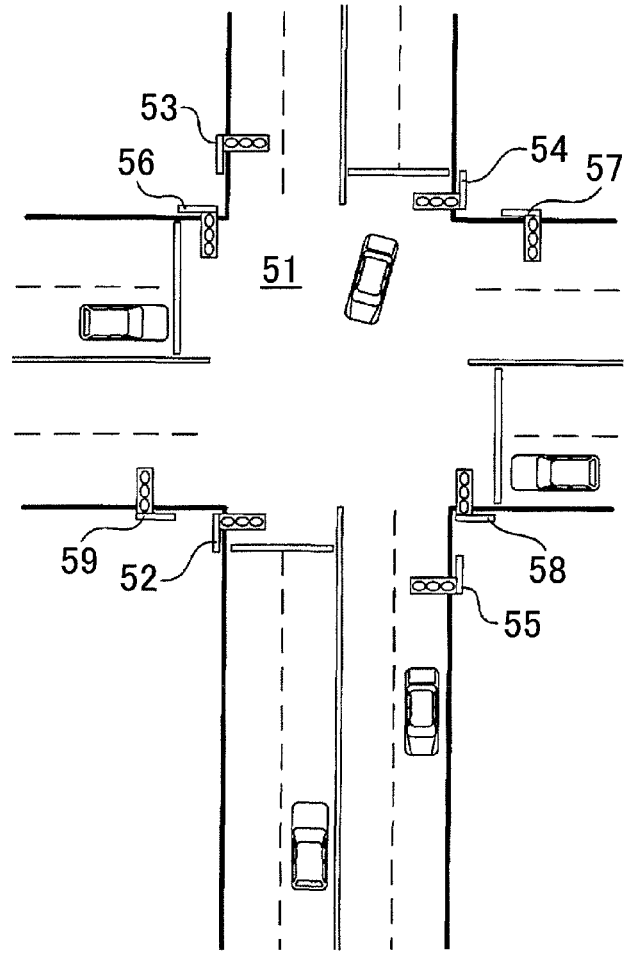
FIG. 2 illustrates example traffic lights installed at a junction.
FIG. 3 illustrates an example storage area in a feature DB.

The traffic light information 38 includes, for each of the traffic lights installed near junctions (intersections) in the country, information such as orientation of the traffic light (that is, the direction in which the traffic light faces; hereinafter referred to as "installation orientation"), the number of lights (three-light type, one-light type, and the like), and the positional coordinates of the traffic light (hereinafter referred to as "installation coordinates"). In cases where a plurality of traffic lights are installed near of one junction, the installation orientation and the installation coordinates are stored in the traffic light information 38 for each of the plurality of traffic lights. For example, as illustrated in FIG. 2, eight traffic lights 52 to 59 are installed at a junction 51 at which roads, each having two traffic lanes on each side, intersect with each other. In this case, the traffic light information 38 relating to the junction 51 includes the installation orientation, the installation coordinates, and the like of the traffic lights 52 to 59.

The traffic light information 38 may include only information relating to a traffic light nearest to an exit side of the junction for each exit direction, that is, the last traffic light visible to the user when the vehicle passes through the junction (hereinafter referred to as an "exit-side traffic light"). For example, at the junction 51 illustrated in FIG. 2, the traffic light information 38 includes information relating to the traffic light 53 serving as the exit-side traffic light when the vehicle travels in an exit direction from bottom to top in FIG. 2, information relating to the traffic light 55 serving as an exit-side traffic light when the vehicle travels in an exit direction from top to bottom in FIG. 2, information relating to the traffic light 57 serving as an exit-side traffic light when the vehicle travels in an exit direction from left to right in FIG. 2, and information relating to the traffic light 59 serving as an exit-side traffic light when the vehicle travels in an exit direction from right to left in FIG. 2. That is, the traffic light information 38 may include only the installation orientation and the installation coordinates of the traffic lights 53, 55, 57, and 59 among the eight traffic lights 52 to 59. Alternatively, the traffic light information 38 may include only information relating to a traffic light nearest to an access side of the junction (in other words, a departure place side) for each access direction, that is, the first traffic light visible to the user when the vehicle enters the junction (hereinafter referred to as an "access-side traffic light"). Instead of traffic lights, information relating to stop lines may be included in the traffic light information 38.

The navigation ECU 13 determines a guidance junction that is located in front of the vehicle in the direction of travel and junctions that are located closer to a departure place of a navigation route than the guidance junction (hereinafter referred to as "preceding junctions") based on the data stored in the map information DB 31 as described below. The navigation ECU 13 also acquires the traffic light information 38 relating to traffic lights near the guidance junction and the preceding junctions. The navigation ECU 13 creates the feature table 34 (described below; see FIG. 8) on the basis of information relating to the determined guidance junction and the preceding junctions and the acquired traffic light information 38. The guidance junction herein refers to a junction at which the user is instructed to, for example, turn left or right while the navigation system 1 provides travel guidance according to the navigation route set in the navigation system 1.

The feature DB 32 includes information relating to road surface markings serving as features formed on road surfaces. FIG. 3 illustrates an example storage area in the feature DB 32. As illustrated in FIG. 3, the feature DB 32 includes coordinate data for determining the positions of the road surface markings on maps, type information for identifying the types (for example, stop lines, pedestrian crossings, character strings, and maximum speeds) of the road surface markings formed on the road surfaces, identifiers (IDs), objects to be controlled associated with the road surface markings (for example, stop lines, corners, junctions, and traffic lights), and along-the-road distances to the objects to be controlled associated with the road surface markings.

For example, in the example illustrated in FIG. 3, a road surface marking of "stop line (ID: 123)" is formed at coordinates (x1, y1), and is associated with a "junction", located eight meters ahead, as an object to be controlled. When the navigation ECU 13 identifies any of the road surface markings recorded in the feature DB 32 from an image captured by the back camera 19, the navigation ECU 13 indirectly calculates a detailed distance between the vehicle and the object to be controlled associated with the identified road surface marking from the along-the-road distance to the object to be controlled to perform guidance and vehicle control on the basis of the calculated distance.

The guidance phrase condition table 33 includes details of phrases to be output when guidance on a guidance junction is provided. The guidance phrase condition table 33 also includes, for example, conditions for starting the guidance output associated with the phrases. The guidance phrase condition table 33 will be described in more detail with a specific example. FIG. 4 illustrates an example guidance phrase condition table 33. FIG. 5 illustrates a guidance starting point defined by the guidance phrase condition table 33 illustrated in FIG. 4. FIG. 4 illustrates guidance, among the guidance instructions on a guidance junction, to be output in cases where, in particular, a traffic light is installed at the guidance junction and where the user is instructed to turn right or left with expressions using the traffic light. In the following example, traffic lights are installed at both the guidance junction and preceding junctions. The junction next to the guidance junction on the near side (on the departure place side along the navigation route) is referred to as a first preceding junction, the junction next to the first preceding junction on the near side (on the departure place side along the navigation route) is referred to as a second preceding junction, and the junction next to the second preceding junction on the near side (on the departure place side along the navigation route) is referred to as a third preceding junction.

As illustrated in FIG. 4, in cases where guidance such as "turn left (right) at the second traffic light" is provided, the output of the guidance needs to be started while the user can count two traffic lights including the traffic light at the guidance junction before the vehicle enters the guidance junction. To do this, output of the guidance phrase such as "turn left (right) at the second traffic light" is started when the vehicle has passed through a guidance starting point set for an exit-side traffic light at the second preceding junction. In this embodiment, the guidance starting point set for the exit-side traffic light at the second preceding junction corresponds to a point where the state of the exit-side traffic light at the second preceding junction is switched from visible to invisible to an occupant (in particular, the driver) of the vehicle. The point at which the state of the exit-side traffic light at the second preceding junction is switched from visible to invisible to the vehicle occupant is determined from the position of the vehicle relative to the exit-side traffic light, and varies depending on the type of the vehicle (more specifically, depending on the shape of the vehicle and the shape of the front window). For example, in cases where the state of the exit-side traffic light at the second preceding junction is switched from visible to invisible to the vehicle occupant when the vehicle passes through a point five meters short of the exit-side traffic light at the second preceding junction, a point A five meters short of an exit-side traffic light 63 at a second preceding junction 62 next but one to a guidance junction 61 on the near side of the guidance junction 61 is set as a guidance starting point as illustrated in FIG. 5, and guidance on the guidance junction is provided when the vehicle passes through the point A. This enables the user provided with the guidance to count two junctions, that is, a first preceding junction 64 and the guidance junction 61 at which traffic lights are installed, before the vehicle enters the guidance junction 61, and to clearly identify that "the second traffic light" is an access-side traffic light 65 installed at the guidance junction 61.

Herein, the number of traffic lights in the guidance phrase is desirably the number of traffic lights in units of junctions. That is, in cases where a plurality of traffic lights are installed at the same junction of, for example, a large road, the plurality of traffic lights are desirably counted as one. In this case, the number of traffic lights in the guidance phrase corresponds to that of the junctions at which the traffic lights are installed (that is, intersections with the traffic lights). However, it is desirable that traffic lights (for example, push-button traffic lights) installed at positions other than junctions be also counted in cases where the number of traffic lights is counted in units of junctions. The same applies to the following description.

The guidance phrase condition table 33 similarly includes other guidance phrases. The navigation directions at the guidance junction may include, for example, diagonally right (left) and nearer right (left) in addition to left and right.

The feature table 34 is created by the navigation ECU 13 when the vehicle reaches a point within a predetermined distance (for example, within 1.47 kilometers) from the guidance junction as described below. The feature table 34 specifies the positions of stop lines and exit-side traffic lights at the guidance junction and the preceding junctions relative to the guidance junction in front of the vehicle in the direction of travel (see FIGS. 8A and 8B). The feature table 34 will be described in detail below.

The navigation ECU 13 controls the entire navigation system 1. The navigation ECU 13 includes a CPU 41 and internal storage devices. The CPU 41 serves as a computing device and a control device. The internal storage devices include, for example, a RAM 42 that serves as a working memory used when the CPU 41 performs various computations and that stores data such as route data obtained when routes are searched for; a ROM 43 in which programs for control, a junction guiding program (described below; see FIGS. 6 and 7), and other programs are recorded; and a flash memory 44 that stores the programs read from the ROM 43. Herein, the navigation ECU 13 configures various units serving as processing algorithms. For example, a navigation-route setting unit sets a navigation route from a place of departure (for example, the current position of the vehicle (movable body)) to a destination and a guidance junction to guide traveling of the vehicle. A traffic-light-position acquiring unit acquires the positions of exit-side traffic lights at preceding junctions that are located closer to the departure place of the navigation route than the guidance junction. A movable-body-position acquiring unit acquires the position of the movable body (vehicle). A guidance-starting-point acquiring unit acquires the positions of guidance starting points determined from the position of the movable body relative to the exit-side traffic lights at the preceding junctions. A passage determining unit determines whether or not the movable body has passed through the guidance starting points from the position of the movable body and the positions of the guidance starting points. A junction guiding unit starts guidance on the guidance junction when the passage determining unit determines that the movable body has passed through the guidance starting point. A feature detecting unit detects features (for example, stop lines) on the departure place side of the navigation route at the preceding junctions. A distance calculating unit calculates the travel distance of the movable body after the feature detecting unit detects the features. A feature-distance acquiring unit acquires distances between the features and the guidance starting points (feature distances). A feature-information acquiring unit acquires feature information. The feature information includes the features detected by the feature detecting unit and positional information associated with the features. A vehicle-information acquiring unit acquires vehicle information relating to the vehicle. A switching-point determining unit determines switching points at which the state of the exit-side traffic lights at the preceding junctions is switched from visible to invisible to the vehicle occupant on the basis of the vehicle information.

The operating unit 14 includes operating switches (not illustrated) such as various keys and buttons, and is operated when, for example, the user inputs a place of departure serving as a travel starting point and a destination serving as a travel end point. The navigation ECU 13 performs control to execute various operations corresponding to switching signals output, for example, when the switches are pushed down. The operating unit 14 may include a touch panel disposed on the front surface of the liquid crystal display 15. In addition, the operating unit 14 may include a microphone and a voice recognition device.

The liquid crystal display 15 displays, for example, map images including roads, traffic information, operation guidance, operation menus, key guidance, a navigation route from the place of departure to the destination, guidance along the navigation route, news, weather forecasts, time, email messages, and television programs. In particular, in this embodiment, when the vehicle reaches such a point that the guidance junction is located within a predetermined distance (for example, 300 meters) ahead of the vehicle in the direction of travel, the liquid crystal display 15 displays an enlarged view in the vicinity of the guidance junction and the direction of travel of the vehicle at the guidance junction.

The speaker 16 outputs guidance such as traffic information and voice guidance used to guide the driver along the navigation route on the basis of instructions issued from the navigation ECU 13. In particular, in this embodiment, when the guidance junction exists in front of the vehicle in the direction of travel, the speaker 16 outputs voice guidance on the guidance junction at a predetermined guidance starting timing based on the details of the guidance. For example, voice guidance such as "turn left at the second traffic light" is output when the exit-side traffic light at the second preceding junction becomes invisible to the vehicle occupant.

The DVD drive 17 can read data recorded in recording media such as DVDs and CDs. For example, reproduction of music and video and update of the map information DB 31 are carried out on the basis of the data read by the DVD drive 17.

The communication module 18 is a communication device that receives traffic information including congestion information, restriction information, and traffic accident information transmitted from traffic information centers such as the VICS center and probe centers. The communication module 18 corresponds to, for example, a cellular phone or a data communication module (DCM).

The back camera 19 uses a solid-state image sensor such as a CCD sensor, and is provided near an upper central portion of a license plate at the back of the vehicle such that the line of sight of the back camera 19 is directed downward by a predetermined angle from a horizontal line. The back camera 19 captures images behind the vehicle in a direction opposite to the direction of travel while the vehicle travels. The types and the positions of the features around the vehicle are detected by performing image recognition processing on the captured images. Detailed along-the-road distances between the vehicle and objects to be controlled (for example, stop lines, corners, junctions, and traffic lights) are indirectly calculated from the detected features.

Figure 6:
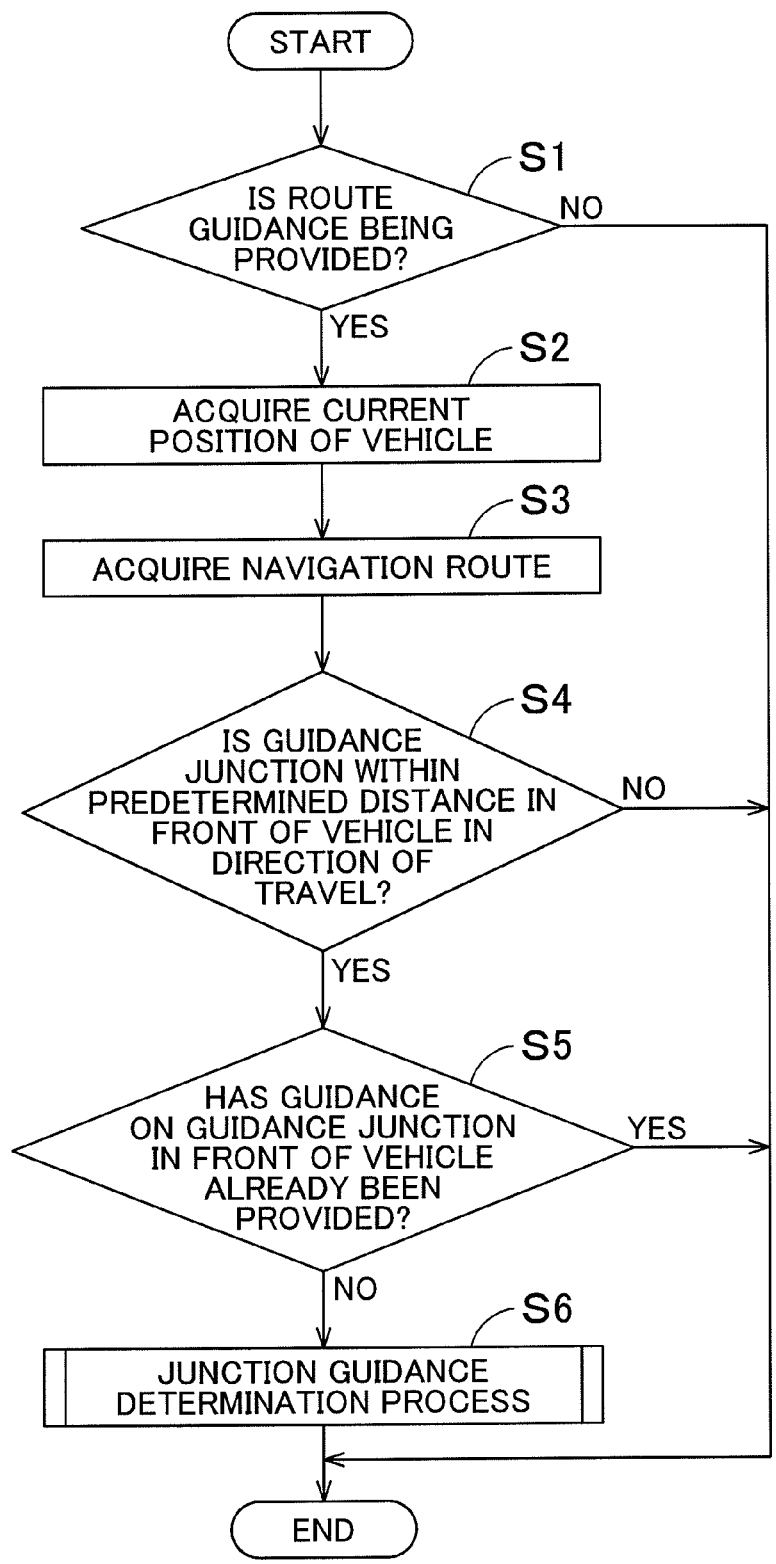
FIG. 6 is a flow chart of a junction guiding program according to the exemplary embodiment.
Figure 7:
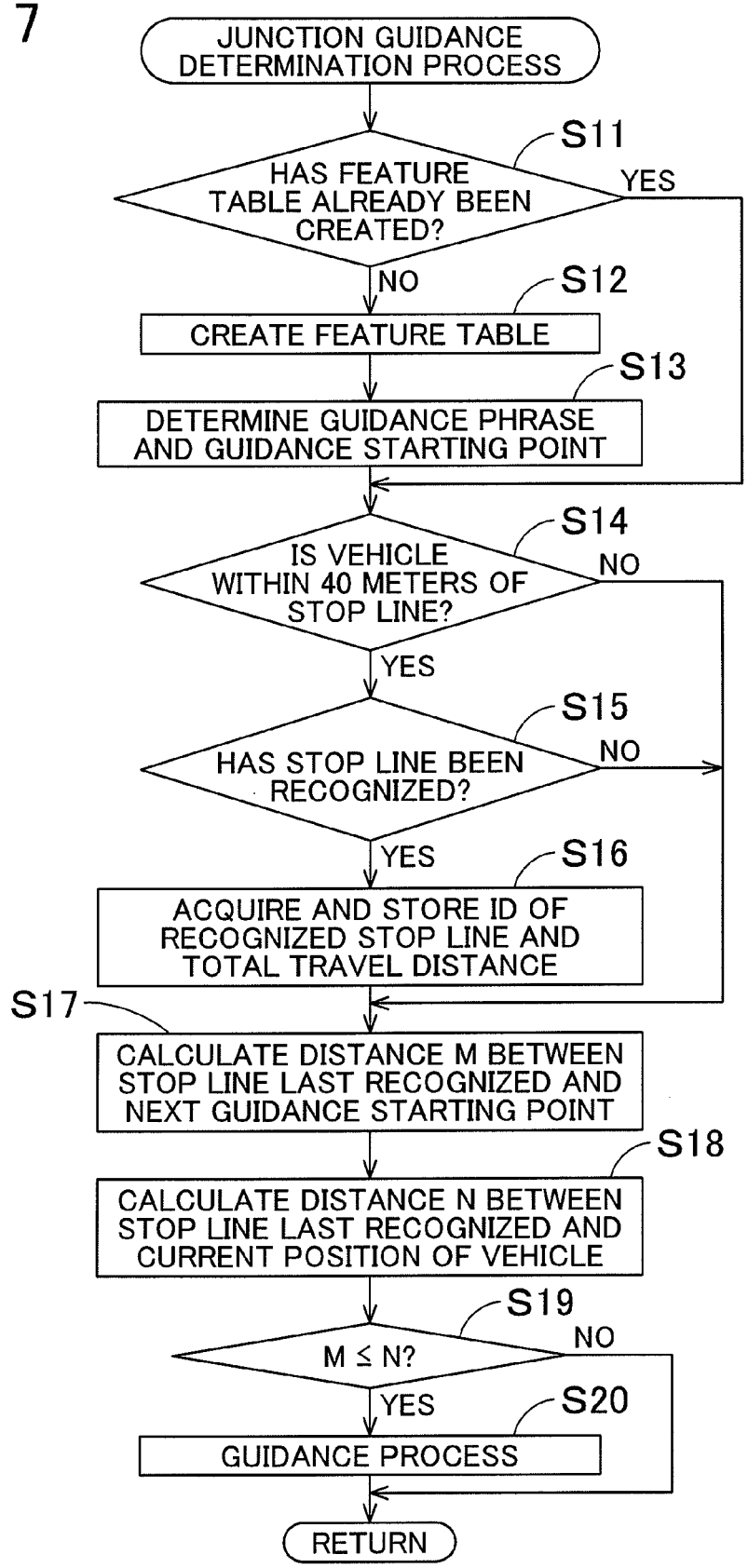
FIG. 7 is a flow chart of a sub-process program of a junction guidance determination process according to the exemplary embodiment.

The junction guiding program executed by the navigation ECU 13 in the navigation system 1 having the above-described configuration will now be described with reference to FIG. 6. FIG. 6 is a flow chart of the junction guiding program according to this embodiment. Herein, the junction guiding program is a program to provide guidance on the guidance junction on the navigation route, and is repeatedly executed at predetermined intervals (for example, each time the current position of the vehicle is detected) after the accessory (ACC) power of the vehicle is turned on. The program illustrated in the flow charts in FIGS. 6 and 7 are stored in, for example, the RAM 42 or the ROM 43 included in the navigation system 1, and executed by the CPU 41.

In Step 1 of the junction guiding program, the CPU 41 determines whether or not route guidance based on a navigation route set in the navigation system 1 is being provided. In the following description, "Step" is abbreviated as "S". The navigation route is a recommended route from a place of departure (for example, the current position of the vehicle) to a destination selected by the user, and is set on the basis of route search results. Route search is performed on the basis of, for example, well-known Dijkstra's algorithm using information such as the link data 35 and the node data 36 stored in the map information DB 31 and traffic information acquired from the VICS center.

If it is determined that route guidance based on the navigation route set in the navigation system 1 is being provided (Yes in S1), the process proceeds to S2. If it is determined that route guidance based on the navigation route set in the navigation system 1 is not being provided (No in S1), the junction guiding program is ended.

In S2, the CPU 41 acquires the current position of the vehicle from results obtained by the current-position detecting unit 11. The CPU 41 also performs map matching in which the current position of the vehicle on map data is determined. It is desirable that the current position of the vehicle be accurately determined using a high-precision location technology as described below. The high-precision location technology herein enables detection of cruising lanes and the highly accurate position of the vehicle by detecting information relating to white lines and road surface paintings captured by the back camera 19 attached to the rear of the vehicle using image recognition and by comparing the information with the feature DB 32 in which information relating to white lines and road surface paintings is stored in advance.

In S3, the CPU 41 acquires the navigation route (including a guidance junction on the navigation route) set in the navigation system 1.

In S4, the CPU 41 determines whether or not a guidance junction exists in front of the vehicle in the direction of travel within a predetermined distance (for example, 1.47 kilometers) on the basis of the current position of the vehicle acquired in S2 and the navigation route acquired in S3. As described above, the guidance junction refers to a junction at which the user is instructed to, for example, turn left or right while the navigation system 1 provides travel guidance according to the navigation route set in the navigation system 1.

If it is determined that a guidance junction exists in front of the vehicle in the direction of travel within a predetermined distance (Yes in S4), the process proceeds to S5. If it is determined that no guidance junction exists in front of the vehicle in the direction of travel within a predetermined distance (No in S4), the junction guiding program is ended.

In S5, the CPU 41 determines whether or not the guidance on the guidance junction in front of the vehicle in the direction of travel has already been provided. In particular, in S5, it is determined whether or not a voice guidance instruction to, for example, turn right or left at the guidance junction has been provided among the guidance instructions on the guidance junction.

If it is determined that the guidance on the guidance junction in front of the vehicle in the direction of travel has already been provided (Yes in S5), the junction guiding program is ended. If it is determined that the guidance on the guidance junction in front of the vehicle in the direction of travel has not been provided yet (No in S5), the process proceeds to S6.

In S6, the CPU 41 performs a junction guidance determination process (described below; see FIG. 7). The junction guidance determination process determines whether or not the timing of starting the guidance on the guidance junction located in front of the vehicle in the direction of travel has come using the high-precision location technology, and starts the guidance on the guidance junction when it is determined that the timing of starting the guidance has come.

Next, sub-processes of the junction guidance determination process performed in S6 will be described with reference to FIG. 7. FIG. 7 is a flow chart of a sub-process program of the junction guidance determination process.

In S11, the CPU 41 determines whether or not the feature table 34 for the guidance junction located in front of the vehicle in the direction of travel has been created. The feature table 34 is created in S12 described below, and specifies the positions of the stop lines and the exit-side traffic lights at the guidance junction and the preceding junctions relative to the guidance junction in front of the vehicle in the direction of travel.

If it is determined that the feature table 34 for the guidance junction located in front of the vehicle in the direction of travel has been created (Yes in S11), the process proceeds to S14. If it is determined that the feature table 34 for the guidance junction located in front of the vehicle in the direction of travel has not been created (No in S11), the process proceeds to S12.

In S12, the CPU 41 acquires positional information relating to the guidance junction located in front of the vehicle in the direction of travel and the preceding junctions located on the near side of the guidance junction from the map information DB 31. The CPU 41 also acquires information relating to the exit-side traffic lights (for example, the positional coordinates and the number of lights) installed at the guidance junction and the preceding junctions from the traffic light information 38. The CPU 41 further acquires information relating to the stop lines (including virtual stop lines in addition to real stop lines) formed at the guidance junction and the preceding junctions (for example, the positional coordinates and the distances to the junctions serving as objects to be controlled) from the feature DB 32 (see FIG. 3). The feature table 34 is then created on the basis of the acquired information. The preceding junctions for which the feature table 34 is created may include all the preceding junctions between the current position of the vehicle and the guidance junction, or may include only predetermined preceding junctions (for example, from the first preceding junction to the third preceding junction).

FIG. 8B illustrates an example feature table 34 created in S12. With reference FIG. 8A, the positions of an exit-side traffic light 76 and a stop line 80 at the guidance junction 72, an exit-side traffic light 77 and a stop line 81 at a first preceding junction 73, an exit-side traffic light 78 and a stop line 82 at a second preceding junction 74, and an exit-side traffic light 79 and a stop line 83 at a third preceding junction 75 relative to a guidance junction 72 in front of a vehicle 71 in the direction of travel are recorded in the feature table 34 illustrated in FIG. 8B.

For example, the feature table 34 records information indicating that the exit-side traffic light 76 at the guidance junction 72 is of the three-light type and is installed 10 meters away from the guidance junction 72 on a side of the guidance junction 72 opposite to a departure place side of the guidance junction 72. Furthermore, the feature table 32 records information indicating that the stop line 82 at the second preceding junction 74 is a virtual stop line having an ID of 345 and is formed 220 meters away from the guidance junction 72 on the departure place side of the guidance junction 72. Relative distances between the guidance junction 72 and the exit-side traffic lights 76 to 79 are calculated from, for example, the positional coordinates of the guidance junction 72 and the positional coordinates of the exit-side traffic lights 76 to 79 acquired from the traffic light information 38. Relative distances between the guidance junction 72 and the stop lines 80 to 83 are calculated from, for example, the positional coordinates of the junctions 72 to 75 and the distances between the stop lines 80 to 83 and the junctions 72 to 75, respectively, serving as the objects to be controlled acquired from the feature DB 32 (see FIG. 3).

In S13, the CPU 41 determines details of guidance phrases provided during guidance on the guidance junction and guidance starting points at which the guidance on the guidance junction starts on the basis of the feature table 34 created in S12. For example, in cases where the vehicle is to turn left at the guidance junction in front of the vehicle in the direction of travel along the navigation route, the CPU 41 determines guidance phrases such as "turn left at the third traffic light", "turn left at the second traffic light", and "turn left at the next traffic light". A point at which the state of the exit-side traffic light at the third preceding junction is switched from visible to invisible to the vehicle occupant (in particular, the driver) is determined as the guidance starting point for the guidance such as "turn left at the third traffic light". Similarly, a point at which the state of the exit-side traffic light at the second preceding junction is switched from visible to invisible to the vehicle occupant (in particular, the driver) is determined as the guidance starting point for the guidance such as "turn left at the second traffic light". Similarly, a point at which the state of the exit-side traffic light at the first preceding junction is switched from visible to invisible to the vehicle occupant (in particular, the driver) is determined as the guidance starting point for the guidance such as "turn left at the next traffic light".

Figure 9:
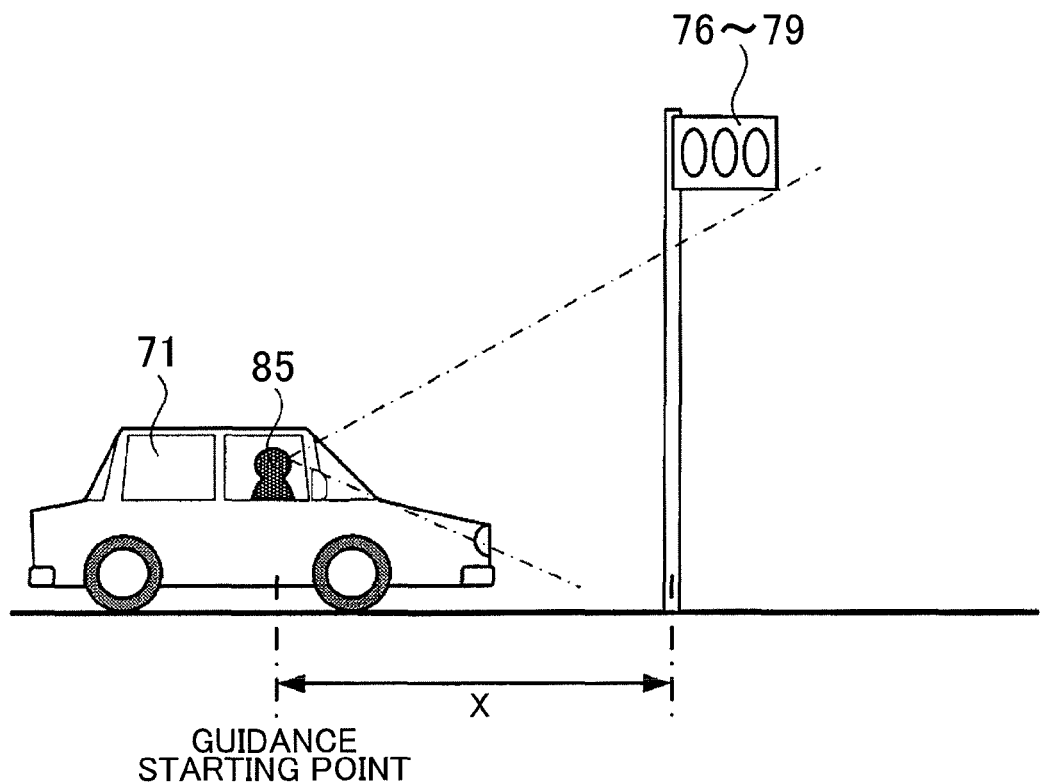
FIG. 9 illustrates a guidance starting point.

The points at which the state of the exit-side traffic lights at the preceding junctions is switched from visible to invisible to the vehicle occupant are determined from the position of the vehicle relative to the exit-side traffic lights, and vary depending on the type of the vehicle (more specifically, depending on the shape of the vehicle and the shape of the front window). Specifically, as illustrated in FIG. 9, the points at which the exit-side traffic lights 76 to 79 become invisible to an occupant 85 of the vehicle 71 while the vehicle 71 is traveling are defined as the guidance starting points. The positions of the guidance starting points are specified by a distance X from the exit-side traffic lights 76 to 79 in a direction toward the place of departure. The distance X that varies depending on the type of the vehicle is recorded in the data recording unit 12, and the CPU 41 acquires the distance X from the data recording unit 12 as vehicle information to determine the guidance starting points in S13. The distance X may be a fixed value (for example, five meters).

In S14, the CPU 41 determines whether or not the vehicle is within 40 meters in the back and forth direction of travel from the stop lines at the preceding junctions based on the feature table created in S12 and the current position of the vehicle acquired in S2.

If it is determined that the vehicle is within 40 meters in the back and forth direction of travel from one of the stop lines at the corresponding preceding junction (Yes in S14), the process proceeds to S15. If it is determined that the vehicle is not within 40 meters in the back and forth direction of travel from one of the stop lines at the corresponding preceding junction (No in S14), the process proceeds to S17.

In S15, the CPU 41 determines whether or not the stop line at the preceding junction is recognized (detected) in a feature recognition process performed at predetermined intervals in parallel with the junction guiding program. The feature recognition process recognizes (detects) a relevant road surface marking from images captured by the back camera 19 when the vehicle is within a predetermined distance (for example, 40 meters) of the positional coordinates of road surface markings recorded in the feature DB 32 (see FIG. 3).

If it is determined that the stop line at the preceding junction is recognized (detected; Yes in S15), the process proceeds to S16. If it is determined that the stop line at the preceding junction is not recognized (not detected; No in S15), the process proceeds to S17.

In S16, the CPU 41 acquires from the feature DB 32 the ID for identifying the recognized stop line at the preceding junction, and stores the ID in the RAM 42. The ID is overwritten with a new ID every time a new stop line at the corresponding preceding junction is recognized. That is, the ID of the stop line at the preceding junction last recognized is stored in the RAM 42. The total travel distance of the vehicle when the stop line at the preceding junction is recognized is also acquired. The total travel distance is the mileage accumulated between the instant when the vehicle is manufactured and the present, and is acquired from, for example, a memory installed in the vehicle. The total travel distance of the vehicle is also stored in the RAM 42.

In S17, the CPU 41 calculates a distance M between the stop line at the preceding junction last recognized and the guidance starting point at which the next guidance is to be provided. Specifically, the distance M is calculated from the feature table 34 (see FIG. 8) created in S12 and the guidance starting points determined in S13.

A method of calculating the distance M in S17 will now be described with a specific example.

Figure 10:
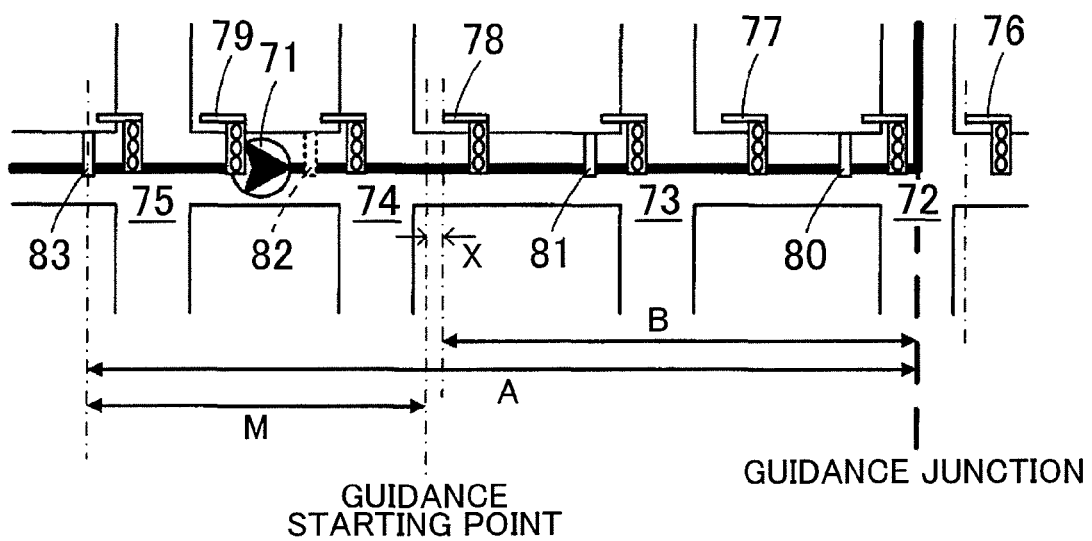
FIG. 10 illustrates a method of calculating a distance M between a stop line at a preceding junction last recognized and a guidance starting point at which the next guidance is to be provided.

For example, in FIG. 10, the vehicle 71 heading to the guidance junction 72 has just recognized the stop line 83 at the third preceding junction 75, and guidance such as "turn left at the second traffic light" is going to be provided. In the example illustrated in FIG. 10, the guidance starting point at which the next guidance is to be provided is a point a predetermined distance X short of the exit-side traffic light 78 at the second preceding junction 74 as described above. Therefore, the CPU 41 first acquires from the feature table 34 a distance A between the stop line 83 and the guidance junction 72 and a distance B between the exit-side traffic light 78 and the guidance junction 72. Subsequently, the distance M is calculated from the following Expression (1).

$$M=A-B-X \quad (1)$$

In S18, the CPU 41 calculates a distance N from the stop line at the preceding junction last recognized to the current position of the vehicle. Specifically, the distance N is calculated from the feature table 34 (see FIG. 8) created in S12, the total travel distance of the vehicle when the stop line was recognized stored in S16, the newly acquired current total travel distance of the vehicle, and results of image recognition performed on the image of the stop line.

A method of calculating the distance N in S18 will now be described with a specific example.

Figure 11:
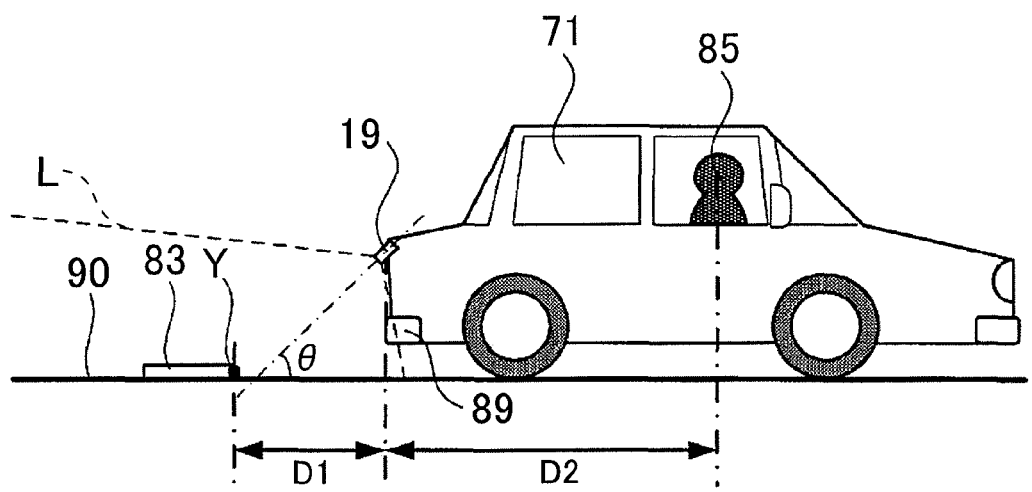
FIG. 11 is a side view of a vehicle that captures an image of the stop line.
Figure 12:
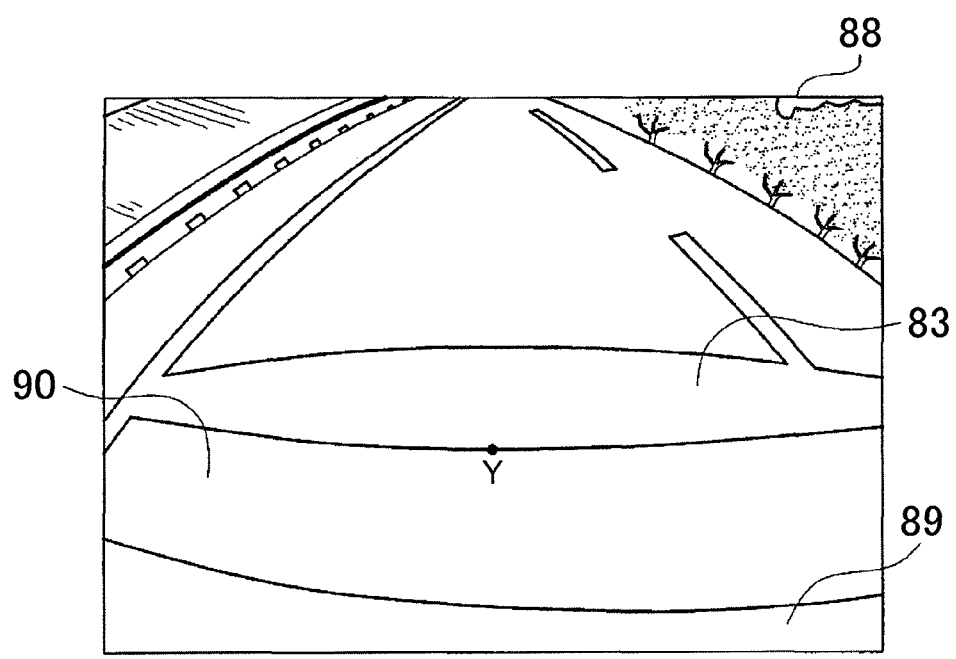
FIG. 12 illustrates the image of the stop line captured by a back camera of the vehicle.

The CPU 41 first calculates the distance between the stop line recognized by the back camera 19 of the vehicle and the vehicle (in particular, driver's seat). FIG. 11 is a side view of the vehicle that captures images of the stop line 83, and FIG. 12 illustrates an image 88 of the stop line 83 captured by the back camera 19 of the vehicle.

As illustrated in FIG. 11, the back camera 19 is attached to the vehicle such that the optical axis L thereof is directed downward by a predetermined angle θ (for example, 45°) from a horizontal line to capture images of the periphery and behind a rear bumper 89 of the vehicle 71, and the capturing range of the back camera 19 is fixed. Therefore, the distance to the object can be calculated from the position (specifically, the number of pixels from the lower edge) of the image data in the image captured by the back camera 19 illustrated in FIG. 12.

Measurement starting points for measuring the distances to the vehicle are defined in advance for road surface markings including stop lines, and are set at corners or end portions of lines (boundaries) that form the road surface markings. For example, a measurement starting point Y is set at a central portion of a boundary on a vehicle side between the stop line 83 and a road surface 90. Therefore, the CPU 41 can calculates a distance D1 between the back camera 19 and the measurement starting point Y from the position of the measurement starting point Y (specifically, the number of pixels from the lower edge to the measurement starting point) in the captured image of the stop line 83 illustrated in FIG. 12.

The CPU 41 also acquires a distance D2 between the position of the back camera 19 and the vehicle (in particular, the driver's seat). The distance D2 between the position of the back camera 19 and the vehicle (in particular, the driver's seat) is stored in the data recording unit 12 as the vehicle information in advance.

Figure 13:
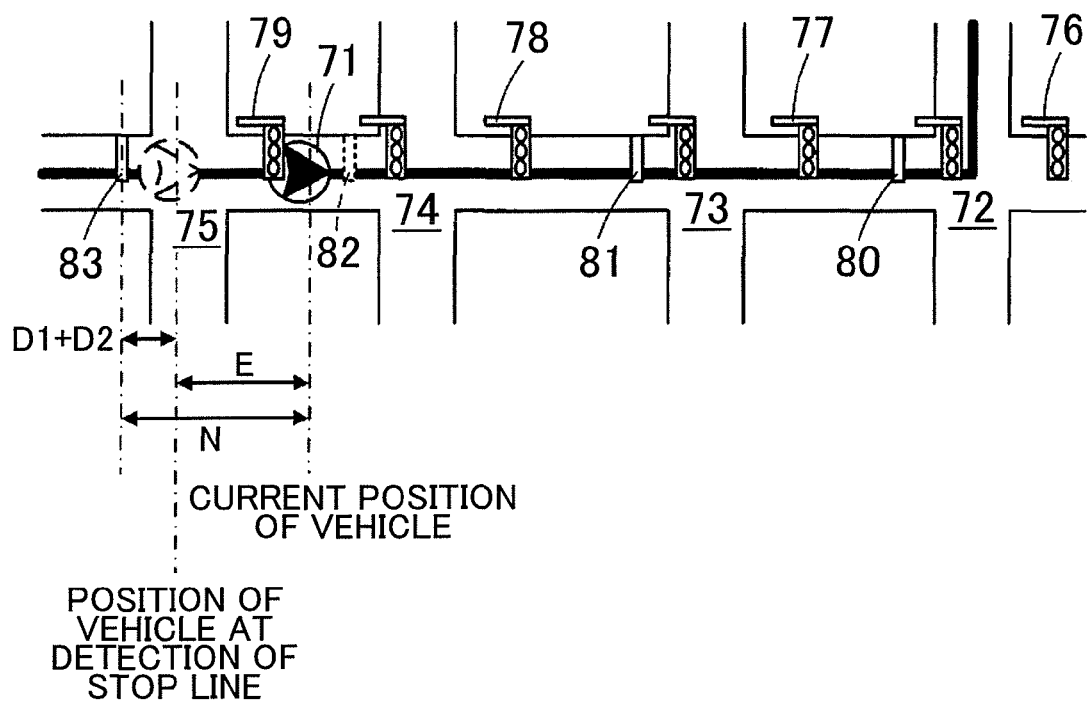
FIG. 13 illustrates a method of calculating a distance N between the stop line at the preceding junction last recognized and the current position of the vehicle.

Subsequently, the CPU 41 calculates a difference E between the newly acquired current total travel distance of the vehicle and the total travel distance of the vehicle when the stop line was recognized stored in S16. The difference E herein corresponds to the travel distance of the vehicle from the instant of the latest stop-line recognition to the present. Subsequently, the distance N is calculated from the following Expression (2) as illustrated in FIG. 13.

$$N=D1+D2+E \quad (2)$$

In S19, the CPU 41 determines whether or not the distance N between the stop line at the preceding junction last recognized and the current position of the vehicle calculated in S18 is more than or equal to the distance M between the stop line at the preceding junction last recognized and the guidance starting point at which the next guidance is to be provided calculated in S17. Specifically, in S19, it is determined whether or not the vehicle has passed through one of the guidance starting points determined in S13.

If it is determined that the vehicle has passed through the guidance starting point determined in S13 (Yes in S19), the process proceeds to S20. If it is determined that the vehicle has not passed through the guidance starting point determined in S13 (No in S19), the junction guiding program is ended.

In S20, the CPU 41 provides guidance on the guidance junction on the basis of the guidance phrase determined in S13. Specifically, the CPU 41 provides guidance for specifying the guidance junction and an exit direction along which the vehicle leaves (that is, guidance for specifying an exit road into which the vehicle enters after leaving the guidance junction). For example, a phrase such as "turn left (right) at the second traffic light" is output from the speaker 16. Furthermore, when the vehicle reaches such a point that the guidance junction is located within a predetermined distance (for example, 300 meters) ahead of the vehicle, the liquid crystal display 15 displays an enlarged view in the vicinity of the guidance junction and the direction of travel of the vehicle at the guidance junction.

This enables the user to correctly determine the guidance junction and the exit road into which the vehicle enters after leaving the guidance junction.

In accordance with the navigation system 1, the travel guidance method using the navigation system 1, and the computer program executed by the navigation system 1 according to this embodiment described in detail above, the guidance starting points determined from the position of the vehicle relative to the exit-side traffic lights at the preceding junctions and the guidance phrases about the guidance junction to be started at the guidance starting points are determined (S13). A distance between a stop line last recognized and the current position of the vehicle is calculated using a high-precision location technology for recognition of the stop line (S18). It is determined whether or not the vehicle has passed through the guidance starting point at which the next guidance is to be provided using the calculated distance (S19). If it is determined that the vehicle has passed through the guidance starting point, guidance on the guidance junction is started (S20). Therefore, it is possible to start the guidance on the guidance junction at an appropriate timing based on the details of the guidance. As a result, the user can correctly identify the guidance junction.

Since it is determined whether or not the vehicle has passed through the guidance starting point from the travel distance E of the vehicle after the stop line is detected and the feature distance M between the stop line and the guidance starting point, the positional relationship between the vehicle and the guidance starting point can be correctly determined using the stop line formed at the preceding junction. As a result, the guidance on the guidance junction can be started exactly when the vehicle has passed through the guidance starting point.

When the distance N, obtained by adding the travel distance E of the vehicle after the stop line is detected to the distance (D1+D2) between the stop line and the vehicle when the stop line is detected, is more than or equal to the feature distance M, it is determined that the vehicle has passed through the guidance starting point (S19). Thus, capturing the image of the stop line using the back camera 19 of the vehicle enables the position of the vehicle after the image of the stop line is captured to be correctly determined from the position of the vehicle relative to the stop line. As a result, the positional relationship between the vehicle and the guidance starting point can be correctly determined, and the guidance on the guidance junction can be started exactly when the vehicle has passed through the guidance starting point.

Since the feature distance M between the stop line and the guidance starting point is acquired from the feature information including the stop line and positional information associated with the stop line, the feature distance M can be easily calculated from the feature information without extra processes for calculating the feature distance M.

In addition, since there is an extremely high probability that the stop lines are drawn on the road surface near the junctions at which the traffic lights are installed, the positional relationships between the vehicle and the guidance starting points are reliably determined when the vehicle passes through the preceding junctions.

Moreover, since the switching points at which the state of the exit-side traffic lights at the preceding junctions is switched from visible to invisible to the vehicle occupant are defined as the guidance starting points, the guidance on the guidance junction can be started when the exit-side traffic lights at the preceding junctions become invisible. As a result, the guidance on the guidance junction can be started at appropriate timings based on the details of the guidance. In particular, a significant effect can be obtained when the guidance uses traffic lights, for example, when the guidance uses the number of traffic lights between the current position of the vehicle and the guidance junction or the number of junctions at which traffic lights are installed.

The present invention is not limited to the above-described embodiment, and various modifications and equivalents can be made without departing from the spirit and scope of the present invention as a matter of course.

For example, although the navigation system 1 provides guidance on the guidance junction by outputting voice guidance from the speaker 16 in this embodiment, the navigation system 1 may provide guidance by displaying texts on the liquid crystal display 15.

Although the stop lines, in particular, are used as the features to be recognized so that the current position of the vehicle is determined in this embodiment, road surface markings other than the stop lines may be used. In addition, obstacles, buildings, road signs, and the like may be used instead of the road surface markings. However, it is desirable that the features to be recognized be on the departure place side of the preceding junctions and exist on the near side of the guidance junction at regular intervals.

Although the switching points at which the state of the exit-side traffic lights at the preceding junctions is switched from visible to invisible to the vehicle occupant are set as the guidance starting points in this embodiment, other points at which the exit-side traffic lights at the preceding junctions become invisible to the vehicle occupant may be set as the guidance starting points. For example, points separated from the switching points toward the guidance junction by a predetermined distance may be set as the guidance starting points. In addition, positions at which the exit-side traffic lights at the preceding junctions are installed may be set as the guidance starting points.

Although the traffic light information 38 includes information relating to all the traffic lights installed near the junctions in this embodiment, the traffic light information 38 may include only information relating to the traffic light nearest to an exit side of the junction for each exit direction. In this case, the present invention can be carried out by replacing the access-side traffic lights in this embodiment with the exit-side traffic lights. Furthermore, the traffic light information 38 may include only information relating to the traffic light nearest to an access side of the junction for each access direction. The traffic light information 38 may include information relating to the stop lines instead of the traffic lights. In this case, the present invention can be carried out by replacing the access-side traffic lights and the exit-side traffic lights in this embodiment with the stop lines. However, it would be desirable that the guidance be provided using the traffic lights and the junctions even if the traffic light information 38 includes information relating to the stop lines instead of the traffic lights.

Although the number of traffic lights between the current position of the vehicle and the guidance junction (or the number of junctions at which the traffic lights are installed) is used for the guidance on the guidance junction in this embodiment, other guidance may be provided. However, the present invention produces a significant effect when the guidance is provided using, in particular, traffic lights.

The present invention may also be incorporated in apparatuses having a function of providing route guidance based on navigation routes instead of the navigation system. For example, the present invention may be incorporated in, for example, mobile terminals such as cellular phones and PDAs, personal computers, and portable music players (hereinafter referred to as "mobile terminals and the like"). The present invention may also be incorporated in systems including servers and mobile terminals and the like. In this case, either the servers or the mobile terminals and the like may perform each step of the above-described junction guiding program (see FIGS. 6 and 7). In cases where the present invention is incorporated in the mobile terminals and the like, the present invention may be used to guide movable bodies other than vehicles, for example, two-wheeled vehicles and users of the mobile terminals and the like.

What is claimed is:

1. A travel guidance system comprising:
   a navigation-route setting unit configured to set a navigation route along which a movable body is guided and sets a guidance junction on the navigation route, wherein the movable body is a vehicle;
   a traffic-light-position acquiring unit configured to acquire a position of an exit-side traffic light at a preceding junction that is located closer to a departure place of the navigation route than the guidance junction;
   a movable-body-position acquiring unit configured to acquire a position of the movable body;
   a guidance-starting-point acquiring unit configured to acquire a position of a guidance starting point, the guidance starting point being determined from a position of the movable body relative to the exit-side traffic light at the preceding junction and serving as a point where guidance on the guidance junction starts;
   a passage determining unit configured to determine whether or not the movable body has passed through the guidance starting point from the position of the movable body and the position of the guidance starting point;
   a junction guiding unit configured to start the guidance on the guidance junction when the passage determining unit determines that the movable body has passed through the guidance starting point,
   a vehicle-information acquiring unit configured to acquire vehicle information relating to the vehicle; and
   a switching-point determining unit configured to determine a switching point at which a state of the exit-side traffic light at the preceding junction is switched from visible to invisible to an occupant of the vehicle from the vehicle information, and
   the guidance starting point is the switching point.

2. The travel guidance system according to claim 1, further comprising:
   a feature detecting unit configured to detect a feature on a departure place side of the navigation route at the preceding junction;
   a distance calculating unit configured to calculate a travel distance of the movable body after the feature detecting unit detects the feature; and
   a feature-distance acquiring unit configured to acquire a feature distance serving as a distance between the feature and the guidance starting point, wherein
   the passage determining unit is configured to determine whether or not the movable body has passed through the guidance starting point from the travel distance and the feature distance.

3. The travel guidance system according to claim 2, wherein
   the feature detecting unit is configured to detect the feature formed on a road on which the movable body travels from an image captured by an image capturing unit attached to the movable body, and
   the passage determining unit is configured to determine that the movable body has passed through the guidance starting point when a distance obtained by adding the travel distance to a distance between the feature and the movable body when the feature is detected by the feature detecting unit becomes more than or equal to the feature distance.

4. The travel guidance system according to claim 2, further comprising:
   a feature-information acquiring unit configured to acquire feature information of the feature detected by the feature detecting unit and positional information associated with the feature, wherein
   the feature-distance acquiring unit is configured to acquire the feature distance from the feature information and positional information relating to the exit-side traffic light at the preceding junction.

5. The travel guidance system according to claim 3, further comprising:
   a feature-information acquiring unit configured to acquire feature information of the feature detected by the feature detecting unit and positional information associated with the feature, wherein
   the feature-distance acquiring unit is configured to acquire the feature distance from the feature information and positional information relating to the exit-side traffic light at the preceding junction.

6. The travel guidance system according to claim 2, wherein the feature is a road surface marking formed on a road surface on which the movable body travels.

7. The travel guidance system according to claim 6, wherein the feature detecting unit is configured to detect a stop line as the road surface marking.

8. A travel guidance apparatus comprising:
   a navigation-route setting unit configured to set a navigation route along which a movable body is guided and sets a guidance junction on the navigation route, wherein the movable body is a vehicle;
   a traffic-light-position acquiring unit configured to acquire a position of an exit-side traffic light at a preceding junction that is located closer to a departure place of the navigation route than the guidance junction;
   a movable-body-position acquiring unit configured to acquire a position of the movable body;
   a guidance-starting-point acquiring unit configured to acquire a position of a guidance starting point, the guidance starting point being determined from a position of the movable body relative to the exit-side traffic light at the preceding junction and serving as a point where guidance on the guidance junction starts;
   a passage determining unit configured to determine whether or not the movable body has passed through the guidance starting point from the position of the movable body and the position of the guidance starting point;
   a junction guiding unit configured to start the guidance on the guidance junction when the passage determining unit determines that the movable body has passed through the guidance starting point; and
   a display configured to display the guidance junction;
   a vehicle-information acquiring unit configured to acquire vehicle information relating to the vehicle; and
   a switching-point determining unit configured to determine a switching point at which a state of the exit-side traffic light at the preceding junction is switched from visible to invisible to an occupant of the vehicle from the vehicle information, and
   the guidance starting point is the switching point.

9. A travel guidance method comprising the steps of:
   setting a navigation route along which a movable body is guided, and setting a guidance junction on the navigation route, wherein the movable body is a vehicle;
   acquiring a position of an exit-side traffic light at a preceding junction that is located closer to a departure place of the navigation route than the guidance junction;

acquiring a position of the movable body;

acquiring a position of a guidance starting point, the guidance starting point being determined from a position of the movable body relative to the exit-side traffic light at the preceding junction and serving as a point where guidance on the guidance junction starts;

determining whether or not the movable body has passed through the guidance starting point from the position of the movable body and the position of the guidance starting point; and starting the guidance on the guidance junction when it is determined that the movable body has passed through the guidance starting point;

acquiring vehicle information relating to the vehicle; and determining a switching point at which a state of the exit-side traffic light at the preceding junction is switched from visible to invisible to an occupant of the vehicle from the vehicle information, and the guidance starting point is the switching point.

10. A non-transitory computer-readable medium including a computer program causing a computer to perform the functions of:

setting a navigation route along which a movable body is guided, and setting a guidance junction on the navigation route, wherein the movable body is a vehicle;

acquiring a position of an exit-side traffic light at a preceding junction that is located closer to a departure place of the navigation route than the guidance junction;

acquiring a position of the movable body;

acquiring a position of a guidance starting point, the guidance starting point being determined from a position of the movable body relative to the exit-side traffic light at the preceding junction and serving as a point where guidance on the guidance junction starts;

determining whether or not the movable body has passed through the guidance starting point from the position of the movable body and the position of the guidance starting point; and starting the guidance on the guidance junction when it is determined that the movable body has passed through the guidance starting point;

acquiring vehicle information relating to the vehicle; and determining a switching point at which a state of the exit-side traffic light at the preceding junction is switched from visible to invisible to an occupant of the vehicle from the vehicle information, and the guidance starting point is the switching point.

\* \* \* \* \*